Oct. 17, 1961     J. V. BOUYOUCOS ET AL     3,004,512
ACOUSTIC-VIBRATION GENERATOR AND VALVE
Filed July 8, 1958                4 Sheets-Sheet 1

INVENTORS
JOHN V. BOUYOUCOS
FREDERICK V. HUNT
BY Rines and Rines
ATTORNEYS

Oct. 17, 1961   J. V. BOUYOUCOS ET AL   3,004,512
ACOUSTIC-VIBRATION GENERATOR AND VALVE
Filed July 8, 1958   4 Sheets-Sheet 2

INVENTORS
JOHN V. BOUYOUCOS
FREDERICK V. HUNT
BY
Rines and Rines
ATTORNEYS

Oct. 17, 1961  J. V. BOUYOUCOS ET AL  3,004,512
ACOUSTIC-VIBRATION GENERATOR AND VALVE
Filed July 8, 1958                                4 Sheets-Sheet 3

INVENTORS
JOHN V. BOUYOUCOS
FREDERICK V. HUNT
BY *Rines and Rines*
ATTORNEYS

INVENTORS
JOHN V. BOUYOUCOS
FREDERICK V. HUNT
BY Rines and Rines
ATTORNEYS

United States Patent Office 3,004,512
Patented Oct. 17, 1961

3,004,512
ACOUSTIC-VIBRATION GENERATOR AND VALVE
John V. Bouyoucos, Cambridge, Mass. (1400 N. Goodman St., Rochester, N.Y.), and Frederick V. Hunt, 44 Beatrice Circle, Belmont, Mass.
Filed July 8, 1958, Ser. No. 747,159
38 Claims. (Cl. 116—137)

The present invention relates to acoustic-vibration generators, and, more particularly, to valving mechanisms for employment therein.

In our prior United States Letters Patent No. 2,792,804, issued May 21, 1957, and No. 2,859,726, issued November 11, 1958, there are described acoustic generators, oscillators or transmitters that operate by virtue of acoustic feed-back applied to a fluid-pressure-actuated valving mechanism. Such a valving mechanism may be made to act periodically to modulate by throttling action an otherwise uniform flow of a fluid medium and in so doing originate pressure variations, these arising from the alternate fluid accelerations and decelerations accompanying the modulatory process. These pressure variations may then be transmitted by an acoustic feedback path to the place where they can react in such phase and magnitude as to control and sustain the valving action, thereby producing a pulsating flow of the fluid medium for generating acoustic vibrations.

While these acoustic-vibration generators have been found to operate admirably in practice, there are occasions when it is desired to decrease the fatigue and thus to increase the life of the valving mechanism. The mechanical valve supporting members described in the said Letters Patent are employed to maintain the valve in correct alignment with respect to its valve seat and to constrain the valve motion generally to a single degree of freedom that permits of a valving action conducive to efficient power conversion. In such function, the mechanical members are, of course, subject to fatigue.

It has been found that by limiting the role of the mechanical members to support of the valve, and by not burdening them with additional load coupling duties, fatigue can generally be avoided, particularly with low-power oscillators operating at sonic frequencies. In the case of high-power oscillators and/or oscillators operating in the ultrasonic frequency range, however, it has been found that desired valve excursions can far exceed values consistent with valve support by mechanical means. For example, with oscillators operating in the vicinity of 20 kilocycles per second (kc./s.), valve accelerations are not infrequently of the order of one million times the acceleration of gravity. Mechanical members in flexure, subject to this acceleration at 20 kc./s., can be shown to have a particularly short life time.

It is accordingly an object of the present invention to provide a new and improved acoustic-vibration generator having a valving mechanism that eliminates mechanical diaphragms, cantilevers, and similar mechanical members and that shall not be subject to the fatigue inherent in such devices. In summary, this end is achieved by providing a valving member that is suitably supported and guided, with thin lubricating fluid films bounding the same, thus producing negligible frictional loss or material wear.

A further object is to provide a new and improved valving member provided with a guidance mechanism having adequate constraints for minimizing small perturbed motions of the valve about its desired position-history; perturbations which might compromise the valve's performance by increasing internal acoustic loss and valve wear.

Other and further objects will be explained hereinafter and will be more particularly pointed out in the appended claims.

The invention will now be described in connection with the accompanying drawings, FIG. 1 of which is a longitudinally sectionalized view of an oscillator constructed in accordance with a preferred embodiment of the invention;

Figure 3:
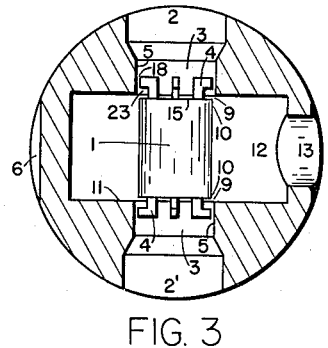
FIGS. 3 and 4 are enlarged views of the valve portion of FIG. 1 in successive positions of operation.

FIGS. 9, 11, 13, 15, 17 and 19, 20, 22, 23, 24 and 25 are views similar to FIG. 3 of still further modified valve structures; and FIGS. 10, 12, 14 16, 18 and 21 are sections taken along the respective lines 10—10, 12—12, 14—14, 16—16, 18—18, and 21—21 of FIGS. 9, 11, 13, 15, 17 and 20, respectively looking in the direction of the arrows.

Figure 1:
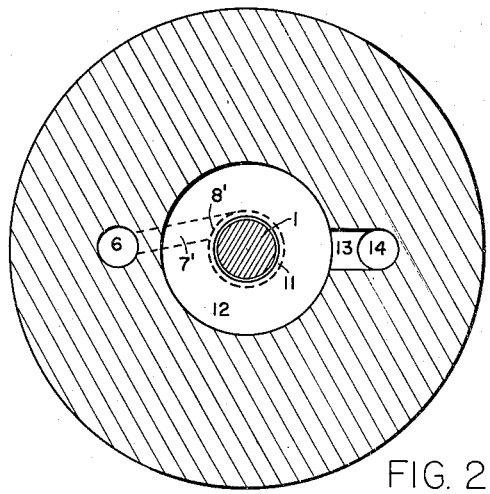
Figure 2:
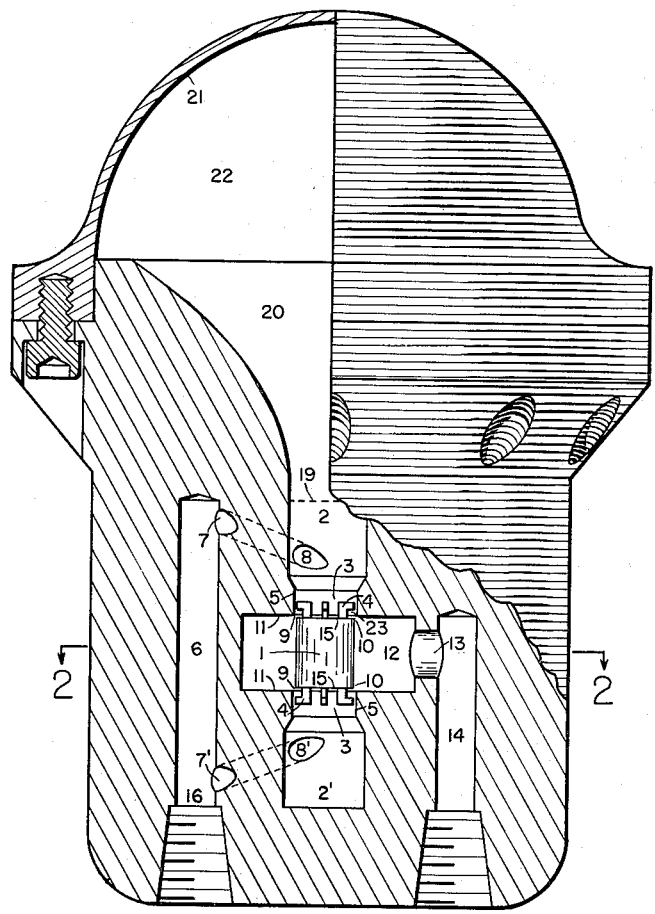
FIG. 2 is a section taken along the line 2—2 of FIG. 1, looking in the direction of the arrows.

As described in the said Letters Patent, the acoustic fluid-operated generators or oscillators may assume a wide variety of forms, including single-ended and push-pull types, operating with feed-back loops or with reflection paths. For purposes of illustration, the preferred embodiment of FIG. 1 is of the push-pull type, having a single-ended load. It is particularly suited for high-frequency operation, with frequencies extending into the low ultrasonic range. The valving member 1 of the oscillator is situated between two fluid-filled stator cavities 2, 2' serving as a fluid housing and communicating with the valve by way of stator ports 3. The valve 1, as well as the cavities 2, 2' and the ports 3, are preferably cylindrical in cross section, as is perhaps more evident from FIG. 2. The valve 1 is supported concentrically within the stator ports 3 by means of a plurality of feet 4 which ride along the interior of the stator port rim 5 free-floating the valve. Their supporting action will be later described in more detail.

The hydraulic circuit of the oscillator can be traced as follows: a fluid, such as, for example, a low viscosity hydraulic oil or other suitable fluid medium, is introduced under pressure into inlet channel 6 from whence it flows through further upper and lower channels 7, 7' into the inlets 8, 8' of the respective cavities 2, 2'. Upon issuing from these inlets 8, 8', the fluid fills the cavities 2, 2' as well as the interior of a load-coupling horn 20, shown divergingly tapering upward, and a cavity 22 bounded by a substantially hemispherical window 21. Such horns and windows are discussed in more detail in the said Letters Patent; and it is to be understood that other types of well-known output couplers may similarly be employed.

From the cavities 2, 2', the fluid enters a discharge cavity 12 by passing through annular orifices 9 that comprise the regions between the circular rims 10 of the valve 1 and the front edges 11 of the before-mentioned slightly larger diameter rims 5 of the stator ports 3. From the discharge cavity 12, the flow passes through the outlet 13 at low pressure into the exit channel 14.

Figure 4:
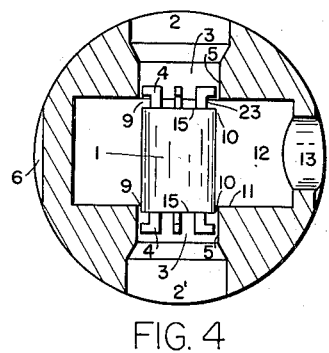

The operation of the oscillator described in the said Letters Patent involves introducing the fluid medium under pressure into the housing within which, or at the exit from which, the flow of the fluid may be subjected to a variational or modulatory throttling action by the valving mechanism; the resulting fluid dynamic forces being conveyed by means of acoustic delay or feedback path to act upon the valving mechanism in such phase and magnitude as to control and sustain its valving action, thereby to produce a pulsating flow of the fluid medium for generating acoustic vibrations. Suffice it for present purposes, therefore, to state that a displacement of the valve 1 from its equilibrium position, as shown in FIGS. 1 and 3 caused by, for example, turning on the fluid flow or by other disturbances, will be accompanied by a variation in the fluid flow through the two orifices 9. In FIG. 4, the valve 1 has been displaced downward. The upper orifice 9 is then clearly open while the lower orifice 9 is closed except for a small leakage flow in the clearance gap between the lower rim 10 of the valve and the rim 5 of the lower stator port 3.

If we assume that an average flow is established within the oscillator circuit, as previously described, and if the valve 1 should then be caused to execute a sinusoidal displacement about its equilibrium position at some frequency, there will exist a variation in the flow through each orifice 9 and an accompanying variation of the fluid pressure at each stator port 3; the corresponding variations in the opposing stator cavities being essentially 180° out of phase. The resulting pressure variations react back upon the exposed faces 15 of the valve 1 and can thus modify its motion. If the net force reaction back upon the valve 1, as produced by these fluid pressures, is of such phase and magnitude as to enhance the original displacement, and, hence, the degree of flow modulation, the oscillation will grow until it is eventually limited by some nonlinearity within the system. Under these circumstances, the system acts as a generator of self-excited oscillations.

A portion of the input flow power is always diverted to accelerate fluid through the orifices. In the presence of oscillations, a further fraction of the input power appears as acoustic power in the oscillator circuit. A portion of this acoustic power is dissipated in the internal acoustic losses of the system, while the remainder may be conveyed to an external acoustic load.

In the particular system of FIG. 1, pressure variations in the cavity 2 will be transmitted by the horn 20 to the interior surface of the hemispherical cap or window 21. If a suitable medium is in contact with the external surface of the window 21, a fraction of the incident energy may be conveyed through the window to be accepted by the medium while the remaining energy will be reflected back into the oscillator and will help sustain the oscillations. As before stated, of course, other forms of load-coupling devices may also be employed, and some of these will be described in connection with other embodiments of the invention.

The frequencies at which oscillations can be sustained are those for which the net acoustic reactance, seen looking into the two stator cavities 2 from the entrances to the two stator ports 3, is equal in magnitude, but of opposite sign, to the net acoustic mass reactance presented by the exposed faces 15 of the valve. There may be a number of modes for which this condition can exist. A preferred one, in the case of FIG. 1, is the lowest symmetrical mode which would exist in the event the cavity 2 were blocked as indicated by the dotted line at 19, so as to appear as a mirror image of the cavity 2' and its termination. For this mode, the cavity length is less than a quarter wavelength in the contained fluid at the oscillation frequency. By suitably controlling the length of the feed-line 8—7—6—7'—8' joining the cavities, as well as the impedance presented at 19 by the load coupling device, the symmetrical mode can be sustained in the presence of an asymmetrical load.

The length of the feedline 8—7—6—7'—8' joining the stator cavities is presumed, in the example of FIG. 1, to be of the order of one wavelength ($\lambda$), with the channel 7'—8' being one-quarter wavelength long. This will place the inlet flow connector 16 at the position of a pressure minimum in the standing-wave field within the feedline. With the flow inlet at this position, little energy will be conveyed from the acoustic circuit of the oscillator back into the fluid piping system. Other feed-line lengths can, of course, be used, such as total lengths which are multiples of $\lambda/2$, although in certain cases this may be neither necessary nor desirable. In these latter cases, however, the impedance seen looking back up the inlets 8, 8' from the cavity interiors must be taken into account when calculating the oscillation frequency.

Generally, when one attempts to design feed lines 8—7—6—7'—8' of length $n\lambda/2$, where $n$ is integral and larger than unity, it has been found that more easily excited modes of oscillation will exist at lower frequencies for which $n$ is non-integral. An undesired mode can usually be supressed, however, by the addition of acoustic circuitry which will short-circuit oscillations at the undesired frequency while not appreciably affecting the desired mode of oscillation.

It should be evident that the efficiency of power conversion will increase if one can decrease the amount of fluid transported through the orifices 9 when the kinetic energy density of the fluid is high. The kinetic energy of the issuing jet is dissipated by turbulence and viscous shear within the discharge cavity 12 and is not easily recovered as useful acoustic energy. Since the energy density of the issuing jet will be highest when the orifice pressure differential is highest, it is desirable that the orifice flow be essentially cut off during that portion of the oscillation period when the stator port pressure is high. This is accomplished in FIG. 1, for example, when the length of the valve 1, as measured between opposing faces 15, is essentially equal to the separation of the stator rims 11. Since the valve acts dynamically as a mass, its displacement at any given frequency will be in phase opposition to the driving force. Thus, as the pressure in a given port increases, the valve 1 will move toward, or enter, that port. In the case at hand, over the half-period interval when the pressure in a port is above its average value, the corresponding orifice 9 will be substantially closed since the valve rim will lie within that port. The degree of orifice closure or flow cut-off that obtains during the interval when a given valve rim lies within its corresponding stator port will depend upon the clearance in the leakage gap and the viscosity of the fluid. Generally, one will wish to choose the fluid viscosity sufficiently high, and the diametrical clearance between the valve and stator port sufficiently small, so that the flow is viscosity-controlled and, as a result, substantially cut-off while a valve rim lies within its stator port. On the other hand, the viscosity should be small enough and the valve displacement large enough so that over the major portion of the half-period interval when the valve rim lies outside of its stator port the flow is substantially "Bernoulli" controlled, or, in other words, limited only by the kinetic energy of the discharge jet as developed by the pressure drop across the orifice. The major portion of the orifice discharge will then occur only during that part of the cycle when the orifice pressure differential is below its average value and the energy density of the fluid jet is relatively low. This mode of power conversion may be called "Class B" by analogy with the electron-tube "Class B" operation wherein a biasing condition obtains such that the tube current is substantially cut-off for 50% of the oscillation period. A "Class C" mode, on the other hand, for which the primary orifice flow exists for less than 50% of the oscillation period can be achieved by making the length of the valve 1 greater than the stator separation so that the average position of the valve rim lies within the stator port. A practical example of this mode of operation will later be described in connection with the embodiment of FIG. 25.

Turning now to the design of the valve 1 which eliminates mechanical linkage for support and which utilizes fluid films to free-float and to constrain the valve motion to the desired degree, as previously mentioned, the valve unit of FIG. 1 obtains its support through a plurality of feet 4 which ride along the interior of the stator port rims 5. It is evident that the feet 4 will act properly to guide the valve 1 in its motion. Further care must be taken, however, to insure against intimate contact between the feet and the port walls during oscillation. In the event that even incipient solid-to-solid contact occurs, frictional loss, as well as wear, may become excessive. It is therefore desirable to provide a mechanism that will positively center the valve 1 and its feet 4 with respect to the stator port axis and, in addition, provide constraint against any tendency for the valve to wobble during oscillation. This is achieved, in the case of FIG. 1, by tapering, or rounding, one edge of each of the valve feet, as shown at 17 in FIG. 5, and then producing a dissymetry that causes the valve 1 to spin in the direction of the arrows. The spinning motion is generated by directing the flow inlet 8 toward one side of each stator cavity, as is more particularly shown in FIG. 2, and inclining the flow downward toward the valve feet 4, FIG. 1. The fluid in the stator cavities and ports is thereby caused to cyclone or rotate. The resulting fluid drag on the valve feet 4 generates the desired valve rotation. The tapered feet 4, in wiping along the inside of the stator rim 5, invoke an inclined-thrust-bearing action. Pressures build up between the feet and the rim in the gap 18, FIG. 3, which are directly proportional to the peripheral foot velocity and inversely proportional to the individual foot-to-rim spacing. A radially directed centering force is established, therefore, which exists for the case of a spinning valve either in the presence or absence of oscillation. This centering action may be termed "spin-flotation" of the valve.

Dynamic stabilization, or axial constraint of the valve during oscillation arises from another effect. Once the valve is centered concentrically with respect to the stator ports through the action of spin-flotation, any wobbling or precessional motion of the valve about its axis will, by necessity, cause a certain amount of fluid to be squeezed out (or into) the region 18 between surface of the foot 4 and the stator rim 5. If the area covered by the foot 4 is relatively large, and if the nominal spacing between foot and rim is relatively small, the impedance offered by the entrained fluid film in resisting squeeze-out, due both to the fluid's inertia and viscous drag, may be very high. If it is sufficiently high, and if the perturbing force is applied positively for a sufficiently short duration the resulting sideways displacement will amount to only a small fraction of the nominal spacing. If, for example, the principal sideways perturbing force is periodic, arising from some asymmetrical component of the acoustic force driving the valve 1, for a given nominal spacing one chooses a foot area of sufficient size to make the peak sideways displacement during any half period as small as one pleases. Then, given initial centering due to spin-flotation, the valve 1 should retain a concentricity, relative to the stator axis, to any desired extent.

A further feature of the valve 1 of FIG. 1 resides in the fact that the working surface of each of the feet 4 does not extend down to the valve rim due to the presence of a notch 23. This notch serves several purposes. First, it permits the entire valve rim circumference to be active in flow modulation, providing the valve 1 with the highest power capacity for a given diameter. Second, and of greater importance, the notch 23 permits equalization of pressure around the periphery of the working surface of each foot 4. If the notch 23 did not exist and if the valve 1 for some reason became slightly cocked with respect to the stator axis, it will be seen that unequal pressure distributions may occur beneath opposing feet 4, tending to aid the cocking motion. If some means for peripheral pressure equalization does not exist, cocking forces can be generated sufficiently partially to nullify the spin-flotation forces, if not to lock the valve 1 entirely.

In summary, then, the valve member 1 of the oscillator of FIG. 1, while being free of mechanical linkage, is nonetheless guided in its valving action by the presence of the plurality of feet 4 which ride in the stator ports 9. Means are provided to neutralize valve-cocking forces that might arise in asymmetrical flow along the valve perimeter. A rotational flow in the stator cavities induces a spin-flotation of the valve 1, while the valve 1 receives dynamic stabilization at the oscillation frequency by virtue of a high "squeeze-out" impedance in the foot-to-stator rim gap. The valve thus finds itself continuously supported on a fluid, preferably lubricating, film which can neither fatigue nor present an excessive resistance to the valve motion. Under proper oscillator operation, wear in the valving region will be reduced to the very slight erosion of the metal or other surfaces that occurs due to the shearing forces associated with the issuing fluid jet.

Although the particular valve support design of FIG. 1 has many excellent features, other designs may embody characteristics that would be preferred in some instances. In the embodiment of FIG. 6, for example, which as before stated, is a partial cross-sectional view of an oscillator as in FIG. 1, the inlet channels 7, 7' are directed away from, rather than toward, the valve 1. This permits the use of shorter feedline lengths than can be achieved in the design of FIGS. 1 through 5. As may be desired, rotational flow need not be produced within the stator cavities, although it can be produced by suitably directing the entrance ports 8, 8' to one side, as in FIG. 2.

The valve 100 of FIG. 6 has a plurality of feet 4' that ride in the stator rims 5 and that are not notched, but tapered or inclined in the direction of valve displacement. By employing a taper in this direction, and inclined thrust-bearing action during oscillation is invoked which will exert radial forces tending to center the valve. As is more particularly evident from FIG. 7, the corresponding feet 4' on opposing faces 15 of the valve 100 are offset by substantially 45°, helping to establish a more uniform distribution of centering forces. Each foot 4' has one side 24 skewed relative to the other side 25. As a result, when the radial component of fluid flow toward the orifices 9 divides to flow around the foot 4', the subsequent asymmetrical flow path produces a net momentum transfer to the valve 100 which is so directed as to cause the valve to rotate in the direction of the arrows, FIG. 7. Valve rotation can, therefore, be produced in the absence of gross rotational flow. Its purpose in this case is primarily to provide intermittent freeing of the valve 100 from the stator rim 5 as an aid to smooth initiation of oscillations. Once oscillations initiate the valve 100 tends to center itself by virtue of the inward, radially-directed thrust produced under the inclined feet 4'.

Figure 5:
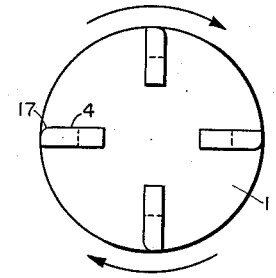
FIG. 5 is a top elevation of the valve of FIGS. 1 through 4, upon still a larger scale with the adjacent arrowed lines indicating direction of spin or rotation.
Figure 6:
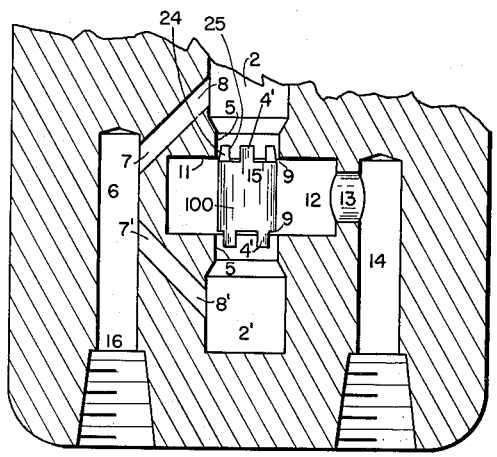
FIG. 6 is a fragmentary view similar to FIG. 1 of a modification.
Figure 8:
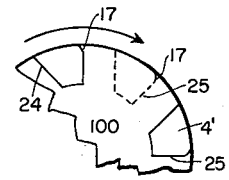
FIG. 8 is a fragmentary view, similar to FIGS. 5 and 7, of another modification, again illustrated with an arrow indicating rotation.
Figure 7:
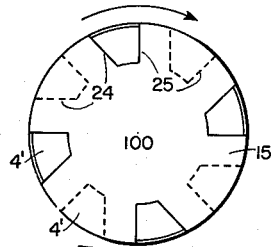
FIG. 7 is a view similar to FIG. 5 of the valve of FIG. 6, shown with an arrow indicating rotation.

FIG. 8 illustrates a modification of the valve 100 of FIGS. 6 and 7 wherein the leading edge of the valve 100 is tapered, or rounded at 17, as in FIG. 5, so that spinning of the valve will in itself generate thrust-type centering, or flotation, forces. The valves of FIGS. 7 and 8 rely also upon high squeeze-out impedance of the fluid film beneath the feet to achieve dynamic stability. It should be noted, moreover, that rotational flow, and hence induced valve rotation, can be obtained irrespective of the positioning of the inlet flow channels 7—8 or 7'—8', as, for example, by the introduction of rigidly mounted skewed fins (not shown) into the stator cavities, which will impart a rotational component to fluid travelling in the direction of the stator axes.

Alternatively, the tapered feet 4' of FIGS. 6 through 8 may be transferred from the valve 100 and placed upon the stator rim. Thus, in FIGS. 9 and 10, the valve 101 is a simple unmodified right cylinder having no constructional complexities, and the feet 401 are disposed upon the stator rim 5.

Figure 9:
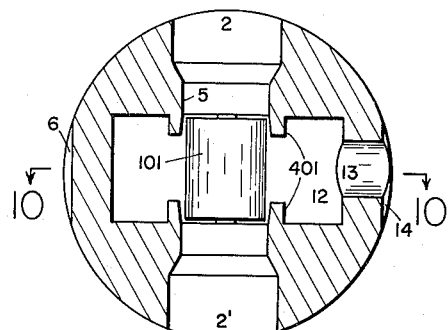
Figure 10:
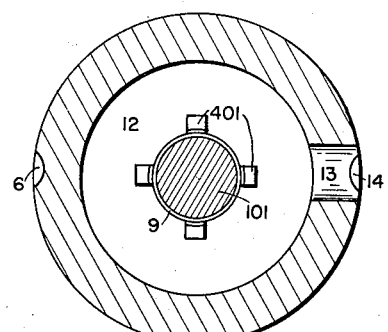
Figure 11:
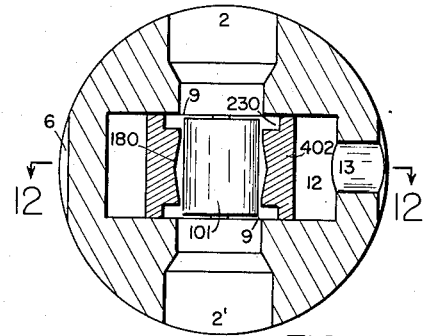
Figure 12:
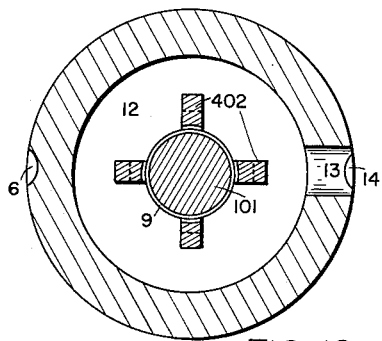

FIGS. 11 and 12 illustrate a modification of the structure of FIG. 9 in which the feet 401 have been connected as to form a set of runners 402 joining the stator rims, and which guide the cylinder valve 101 into the stator ports. The interior surface 180 of the runners is tapered or inclined to invoke radial thrust forces when the valve is in oscillation. Notches 230 in the runners at the point they join the stators isolate the valve support surfaces from the orifice region. Pressures are therefore equalized about the support periphery and potential cocking thrusts on the valve are neutralized.

Figure 13:
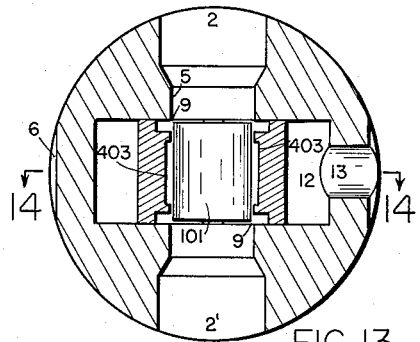
Figure 14:
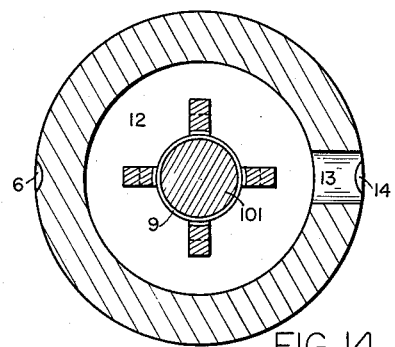

FIG. 13 and FIG. 14 are similar to FIG. 11 and FIG. 12, respectively, except for the fact that the inclined surface 180 under the runners have been replaced by a step bearing 403. This has been found also to be useful in exerting centering forces and in presenting a minimum surface area in close proximity to the valve under which viscous losses can occur. Alternatively, the step-bearing may be built into the wall surface of the valve 103 itself, if desired, as at 103' in the embodiment of FIGS. 17 and 18.

Figure 15:
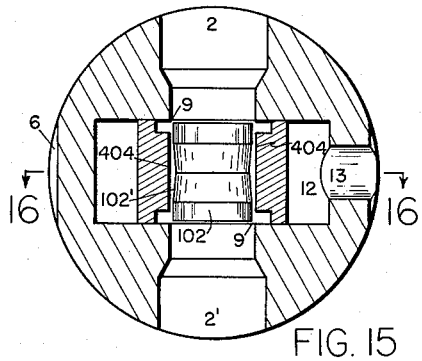
Figure 16:
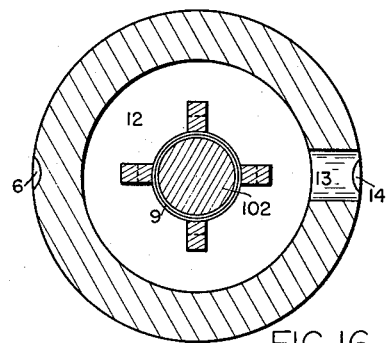
Figure 17:
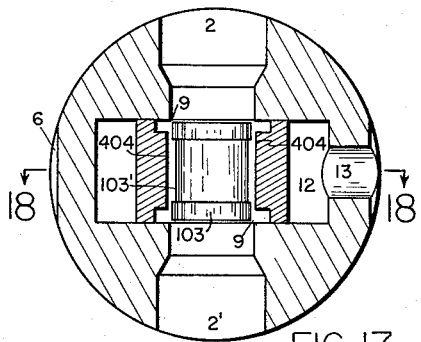
Figure 18:
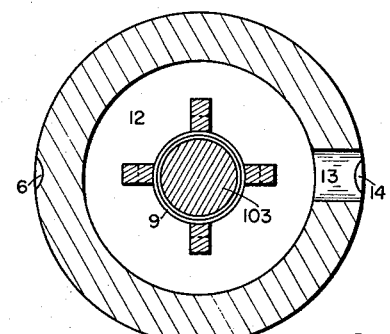

In the modified valve structure of FIGS. 15 and 16, on the other hand, the runners 404 have straight surfaces while the valve 102 itself is provided with a built-in inclined taper at 102'.

Figure 19:
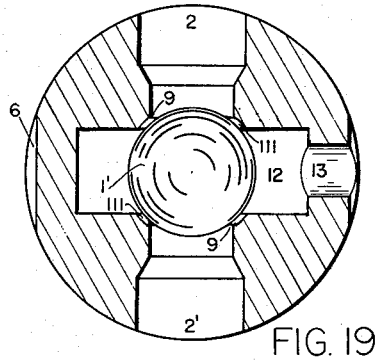

FIG. 19 illustrates still another type of a valving member which is free of mechanical linkage. The view is cut away from an oscillator, such as in FIG. 1, and is identical to the expanded views in FIGS. 3 and 4 with the exception that the valving member 1' is a spherical ball rather than a cylinder. The ball is free to move back and forth between the stator ports and in so doing will open and close the orifices 9 which are now the regions between the stator seats 111 and the surface of the ball 1'. The operation of the oscillator is therefore the same as in the case of the cylindrical valve 1 of FIG. 1 with the exception that, unless the viscosity of the fluid medium is carefully chosen with regard to the orifice dimensions, the mode of operation will always be Class A since a given orifice will never be effectively closed for any substantial fraction of a period.

A basic limitation of the ball design is that for a given stator separation there exists a peak amplitude of oscillation which, if exceeded, will tend to cause solid-to-solid contact between the ball 1' and the stator seat. There is, furthermore, no separate mechanism which will keep the ball 1' absolutely centered with respect to the stator axis, so that unstable flow along its surface may generate a lateral or wobbling motion which may be detrimental to the valving action and which may produce a further limitation on the peak amplitude of oscillation. The spherical geometry of the valve itself, however, serves as a means for substantially self-centering the valve by virtue of the hydrodynamic forces which occur between the ball and its mating spherical seats 111. The chief virtue of the ball valve 1' lies in its simplicity and in the fact that, through rotation, it will continue to present different valving surfaces, thereby minimizing the effects of erosion or wear. The limitations on amplitude and class of operation, of course, can be overcome by changing from the spherical to the cylindrical geometry, before described, so that the valve is free to enter the stator port and thereby fully to block off the orifice.

Figure 20:
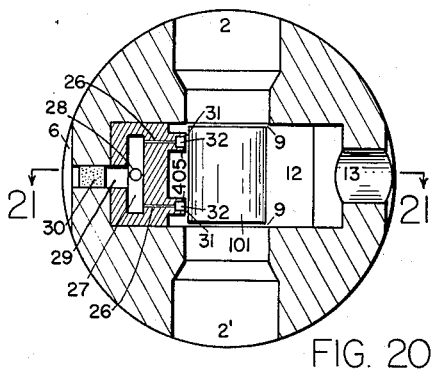
Figure 21:
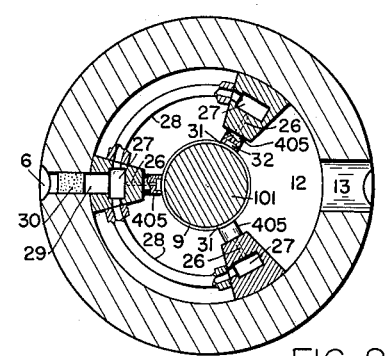

FIGS. 20 and 21 illustrate further means for providing positive free-flotation of the valve. It will be recalled that the spin-flotation of valve 1 in FIG. 1 depended only upon the presence of an average flow through the oscillator and not upon the existence of oscillations. In similar fashion, the cylindrical valve 101 of FIGS. 20 and 21 is floated independently of the oscillatory state by forced lubrication means. Three sets of bearing pads 405 surround the valve 101 and are fed supplemental fluid under pressure through constricted channels 26. Channels 26 receive their fluid supply from cavities 27 which, in turn, are fed via lines 28 from a common source 29. The fluid source 29 connects to the inlet channel 6 through a filtering plug 30 that removes any particulate matter the size of which is such that it would block the constrictions 26. Fluid forced into each bearing pad 405 by virtue of the pressure difference between inlet channel 6 and discharge cavity 12 flows through the clearance gap provided between the annular rim or sill 31 of the pad 405 and the cylindrical surface of valve 101. The relative pressure drop along the constrictions 26 is assumed to be much greater than that arising from flow over the sills 31. Thus, for all practical purposes the flow into the cup 32 of each pad 405 occurs at constant volume rate. Since the resistance to flow in the gap between the rim 31 and the valve surface is inversely proportional to the cube or third power of the gap spacing, the pressure within the cup 32 is highly sensitive to the lateral position of the valve. Thus, by spacing the pads 405 equidistantly around the valve's circumference, an extremely fine control over lateral position can be achieved. If the valve tends to move sideways, pressures build up in the cups 32 for which the gap spacing has been reduced, while the opposite situation holds for the cups 32 on the opposing side. Forces having a component normal to the axis of the valve are exerted, therefore, always to center the valve 101. Again, high impedance to squeeze-out is important for dynamic constraint.

An oscillator of the type shown in FIG. 1, but provided with pressure-flotation of the valve as in FIGS. 20 and 21 has been operated at a frequency of 17 kc./s. for a period equivalent to three billion ($3 \times 10^9$) cycles of the valve. At the end of the run, close inspection of the valve showed no evidence whatsoever of contact between the valve and its supporting members or the stator rim. Furthermore, there was no evidence of rim erosion although the radius of curvature of its edge was no greater than 0.0005" and the valve material was soft "Dural." Input powers during this experiment were approximately 700 watts while the acoustic output power was of the order of magnitude of 100 watts. The power expended in floating the valve was about 10 watts. Acoustic signals in the stator cavities corresponded to peak pressures of about 100 atmospheres, and the peak valve displacement was about 0.005". The radial clearance between valve and stator rims was about 0.0005".

Figure 22:
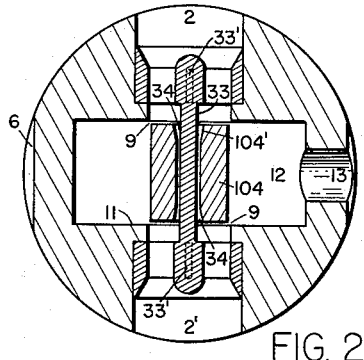

FIG. 22 illustrates yet another means of support for the valve consisting of a central strut 33 running through a center aperture of the valve 104 and rigidly mounted within the stator cavities by spiders 33'. The entrance 34 to the bearing surface at the valve center has been tapered at 104' so that in oscillation inclined-bearing thrusts will center the valve 104 and permit it to ride on the fluid film.

Figure 23:
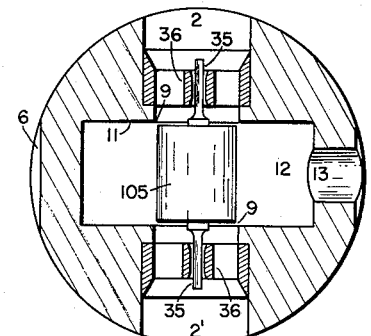
Figure 24:
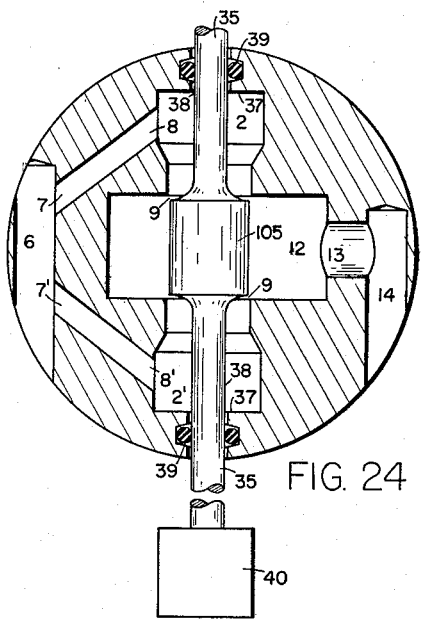

As still a further modification, the bearing shaft 35 of FIG. 23 is mounted rigidly to the valve 105, and can reciprocate in the tapered, cylindrical journals 36 which are fastened to the stators. FIG. 24 illustrates a variation of the valve of FIG. 23 but with the bearing shaft 35 carried through the terminal wall 37 of the oscillator cavities. The bearing openings 38 are sealed by O rings 39 which, however, do not impede oscillatory motion of the valve. By carrying shafts of equal diameter through both cavity terminations, the valve 105 will remain statically balanced when subject to cavity pressurization. By changing the diameter of one shaft relative to the other, however, equal pressures in the cavities 2, 2' will be accompanied by a net static force on the valve 105 tending to displace it in the direction of the cavity holding the larger shaft. This effect may be useful in gaining further control over the valve's equilibrium position or in counteracting an external static thrust.

The shafts 35 of FIGS. 23 and 24 may be connected to an external load device 40. This device might be an external load on the oscillator, such as the bit of a jackhammer, or it may be a load in the form of a control device to influence by external means the performance of the oscillator such as its frequency, or to turn it on and off to produce pulsed operation.

Figure 25:
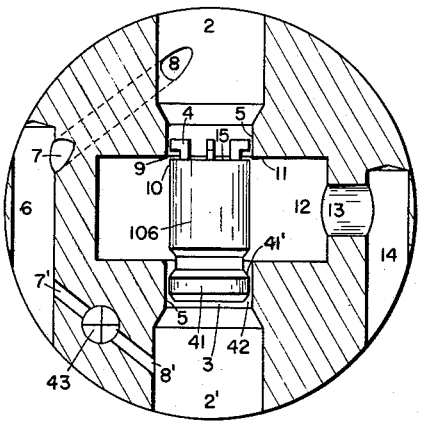

All of the valving members illustrated thus far have been of the push-pull type. The term push-pull, as explained in the said Letters Patent and copending application, signifies that a pair of opposing orifices of variable area generate an out-of-phase flow modulation. This modulation is accompanied by out-of-phase pressures which simultaneously, but separately, push and pull on the valve. Alternatively, one may, as before explained, have "single-ended," rather than "double-ended," flow modulation (i.e., one as contrasted with two orifices operable as variable area devices) and still make use of push-pull pressures to drive the valve. An example of the latter situation is shown in FIG. 25. The valve 106 is similar at its top end to the valve 1 of FIG. 1. At its lower end, however, the valve 106 extends into the lower stator port 3 and is provided with a land 41 which always rides along the stator interior rim 5. Hence the lower orifice is never opened and only the orifice associated with the upper cavity 2 will act to produce modulation of the flow. The gap 42 between the land 41 and the stator rim 5, moreover, is maintained at a uniform spacing during oscillation with the help of radial thrusts associated with the flow under the tapered or inclined edges 41' of the land 41. The gap width is small enough, and the land length long enough, to insure that the leakage flow through the gap does not constitute a significant energy loss. The channel 7—8 is directed toward the side of cavity 2 to establish a rotational flow, as in FIG. 1. The resulting spin of the valve 106 yields, as before, spin flotation, this time from radial thrusts under the feet 4 at the top of the valve 106 and from the journal-bearing action of the stator rim 5 operating in conjunction with the rotating land 41.

If the static pressures were equal in the cavities 2, 2' of the valve 106 of FIG. 25, the valve 106 would position itself so that the upper rim 10 would lie within the upper stator port rim 5 a distance substantially equal to the axial length of the land 41. Under these circumstances, the upper orifice 9 would remain closed for small valving disturbances and oscillation would not be self-initiating. In order to make self-excited oscillations start more reliably, it is best to have the upper face 15 of valve 106 initially in the plane of the front rim 11 of the stator port. This can be achieved by reducing the mean pressure in cavity 2' by a controlled amount using a throttling valve 43 situated in the inlet channel 7'—8'.

A novel feature of the modification of FIG. 25 resides in the fact that after oscillations initiate, and as they increase to full strength, the average position of the upper rim 10 of valve 106 (i.e., the plane of the face 15) will automatically move up into the interior rim 5 of the upper stator port. As a consequence, the orifice 9 will be substantially open for less than 50% of the oscillation period, and a Class C mode of operation will be the result.

To understand the upward translation of the valve requires an appreciation of how the D.C. flow resistances of the various channels and orifices behave in the presence of oscillation. First, the flow through throttling valve 43 and gap 42 is preferably viscosity controlled. The corresponding flow resistances will remain substantially independent of the acoustic signal level and the ratio of the cavity 2' (static) pressure to the supply pressure in channel 6 will remain constant.

The average flow resistance of the variable area orifice 9 is a function of several parameters including the valve displacement, the mean pressure, and the acoustic pressure across the orifice. In normal operation, with the average position of the valve remaining fixed, it can be shown that the average flow resistance of the orifice will reduce in the presence of oscillations, or as the oscillation amplitude is increased.

On the other hand, the relatively small flow resistance of channel 7—8 does not remain constant under increased average flow, but increases. Its resistance to flow is primarily determined by the conversion of pressure energy in channel 6 to kinetic energy in channel 7—8 and the subsequent loss of some kinetic energy in cavity 2 through turbulence and viscous shear. Thus if $\Delta P$ is the pressure drop between the ends of channel 7—8 and if $(1/2)\rho U^2$ is the kinetic energy density of the fluid in the channel, where $\rho$ is its density and $U$ is its linear velocity, conservation of energy requires that $$\Delta P = (1/2)\rho U^2 \qquad (1)$$

neglecting viscous loss. The flow resistance $R_F$ of the channel is then $$R_F = \frac{\Delta P}{U} = (1/2)\rho U \qquad (2)$$

It is thus seen that the flow resistance is not constant but is proportional to velocity, and will increase as the average flow supplied to the oscillator is increased.

As a result of the fact that the flow resistance of the variable area orifice 9 tends to reduce, while the resistance of the inlet channel 7—8 increases as the amplitude of oscillation increases, the ratio of the average pressure in cavity 2 to that in supply channel 6 will tend to reduce. Since the pressure relation between cavity 2' and channel 6 remains fixed, an average pressure unbalance will result between the two cavities tending to displace the average valve position upward. This will be accompanied by a progressive increase in the flow resistance of orifice 9, until the average pressures in cavities 2, 2' are again equalized.

By judicious selection of the parameters that control the flow resistances in question, it is evident that oscillations can be made to start with the valve 106 in a Class A or AB state. Then, upon increasing the input power to a predetermined level, the change in average position of the valve will cause the type of modulation to change to Class C. In effect, means are provided for achieving self-biasing of the equilibrium valve position.

The results of single-ended operation and self-biasing to Class C operation are twofold. First, Class C operation will be accompanied by an increase in power conversion efficiency, but at the expense of reduced power capacity. Appreciable orifice flow occurs for a shorter fraction of the oscillation period, and during an interval when its energy density is small. The shorter flow duration means reduced input power, other factors remaining equal. Second, the power capacity will be further reduced by a factor of two due to the loss of one modulating orifice.

The combination of an increase in efficiency and a reduction in power capacity that is obtained with the valve of FIG. 25 is particularly useful in the case of some high-frequency systems. High-frequency oscillators require high pressures for their operation and hence do not need to be very large in size in order to accept relatively large input powers. When the parts of such oscillators are made large enough to handle, with reasonable ease, the input power capacity may lie in the range, for example, of from one to ten kilowats at 20 kc./s. The resulting level of output power might then exceed the range which the load coupling devices can conveniently handle. A reduction in input power capacity, but with retention of convenient part sizes, may be, therefore, a desired end. An increase in efficiency, of course, is always useful, particularly at high frequencies, where internal losses tend to become relatively significant. It should be evident, also, that appropriate external control of the flow to the individual cavities will permit one to employ a valve 1 as in FIG. 1, with a length greater than the stator separation, to obtain single-ended Class A starting, and ultimate double-ended Class C operation.

Further modifications will occur to those skilled in the art and all such are considered to fall within the spirit and scope of the invention as defined in the appended claims.

What is claimed is:

1. In an acoustic-vibration generator, a housing, means for producing a flow of a fluid medium through the housing for generating acoustic vibrations, a stator port region of the housing in the path of the fluid flow therethrough, and a fluid-pressure actuated valving mechanism disposed within the stator port region and provided with means for free-floating the valving mechanism in the said region with a fluid layer interposed between the valving mechanism and the stator port walls.

2. In an acoustic-vibration generator, a housing, means for producing a flow of a lubricating fluid medium through the housing for generating acoustic vibrations, a stator port region of the housing in the path of the lubricating fluid flow therethrough, and a fluid-pressure actuated valving mechanism disposed within the stator port region and provided with means for free-floating the valving mechanism in the said region with a lubricating fluid layer interposed between the valving mechanism and the stator port walls.

3. In an acoustic-vibration generator, a housing, means for producing a flow of a fluid medium through the housing for generating acoustic vibrations, a pair of oppositely disposed stator port regions of the housing in the path of the fluid flow therethrough, and a fluid-pressure actuated valving mechanism disposed between and within the stator port regions and provided with means for free-floating the valving mechanism in the said regions with a fluid layer interposed between the valving mechanism and the stator port walls.

4. In an acoustic-vibration generator, a housing, means for producing a flow of a fluid medium through the housing for generating acoustic vibrations, a pair of oppositely disposed stator port regions of the housing in the path of the fluid flow therethrough, a fluid-pressure actuated valving mechanism disposed between and within the stator port regions and provided with means for free-floating the valving mechanism in the said region with a fluid layer interposed between the valving mechanism and the stator port walls, and means for controlling the movement of the valving mechanism with respect to the stator port regions in push-pull operation.

5. In an acoustic-vibration generator, a housing, means for producing a flow of a fluid medium through the housing for generating acoustic vibrations, a stator port region of the housing in the path of the fluid flow therethrough, a fluid-pressure actuated valving mechanism disposed within the stator port region and provided with means for free-floating the valving mechanism in the said region with a fluid layer interposed between the valving mechanism and the stator port walls, and means for controlling the degree of movement of the valving mechanism with respect to the stator port walls to provide any of substantially Class A, Class B and Class C operation.

6. Apparatus as claimed in claim 5 and in which the valving mechanism is provided with terminal members extending within the stator port region for controlling the positioning therein of the valving mechanism.

7. In an acoustic-vibration generator, a housing, means for producing a flow of a fluid medium through the housing for generating acoustic vibrations, a stator port region of the housing in the path of the fluid flow therethrough, and a fluid-pressure actuated valving mechanism disposed within the stator port region and provided with means for free-floating the valving mechanism in the said region with a fluid layer interposed between the valving mechanism and the stator port walls, the valving mechanism being so shaped as to constrain its motion in response to the flow of the fluid medium along a direction into and out of the stator port.

8. In an acoustic-vibration generator, a housing, means for producing a flow of a fluid medium through the housing for generating acoustic vibrations, a stator port region of the housing in the path of the fluid flow therethrough, and a fluid-pressure actuated valving mechanism disposed within the stator port region and provided with means for free-floating the valving mechanism in the said region with a fluid layer interposed between the valving mechanism and the stator port walls, the valving mechanism being substantially of spherical shape so as to tend to constrain its motion in response to the flow of the fluid medium along a direction into and out of the stator port.

9. In an acoustic-vibration generator, a housing, means for producing a flow of a fluid medium through the housing for generating acoustic vibrations, a stator port region of the housing in the path of the fluid flow therethrough, and a fluid-pressure actuated valving mechanism disposed within the stator port region and provided with means for free-floating the valving mechanism in the said region with a fluid layer interposed between the valving mechanism and the stator port walls, the valving mechanism being so shaped as to constrain its motion in response to the flow of the fluid medium along a direction into and out of the stator port, and means controlling the valving mechanism for enabling rotation of the valving mechanism in response to the fluid flow in order to cause spin-flotation of the valving mechanism.

10. Apparatus as claimed in claim 9 and in which means are provided for introducing the fluid medium at an angle to the said direction.

11. In an acoustic-vibration generator, a housing, means for producing a flow of a fluid medium through the housing for generating acoustic vibrations, a stator port region of the housing in the path of the fluid flow therethrough, and a fluid-pressure actuated valving mechnism disposed within the stator port region and provided with means for free-floating the valving mechanism in the said region with a fluid layer interposed between the valving mechanism and the stator port walls, the valving mechanism being of substantially cylindrical shape and provided with a plurality of outwardly extending feet for constraining its motion in response to the flow of the fluid medium along a direction into and out of the stator port.

12. In an acoustic-vibration generator, a housing, means for producing a flow of a fluid medium through the housing for generating acoustic vibrations, a stator port region of the housing in the path of the fluid flow therethrough, and a fluid-pressure actuated valving mechanism disposed within the stator port region and provided with means for free-floating the valving mechanism in the said region with a fluid layer interposed between the valving mechanism and the stator port walls, the valving mechanism being of substantially cylindrical shape and provided with a plurality of outwardly extending feet for constraining its motion in response to the flow of the fluid medium along a direction into and out of the stator port, and the feet being shaped to cause spin-rotation of the valving mechanism about the said direction as an axis in response to the fluid flow.

13. In an acoustic-vibration generator, a housing, means for producing a flow of a fluid medium through the housing for generating acoustic vibrations, a pair of stator port regions of the housing in the path of the fluid flow therethrough, and a fluid-pressure actuated valving mechanism disposed between and within the stator port regions and provided with means for free-floating the valving mechanism in the said regions with a fluid layer interposed between the valving mechanism and the stator port walls, the valving mechanism being of substantially cylindrical shape and provided at each stator-port-region end with a plurality of outwardly extending feet for constraining the valving mechanism motion in response to the flow of the fluid medium along a direction into and out of the stator ports.

14. In an acoustic-vibration generator, a housing, means for producing a flow of a fluid medium through the housing for generating acoustic vibrations, a pair of stator port regions of the housing in the path of the fluid flow therethrough, and a fluid-pressure actuated valving mechanism disposed between and within the stator port regions and provided with means for free-floating the valving mechanism in the said regions with a fluid layer interposed between the valving mechanism and the stator port walls, the valving mechanism being of substantially cylindrical shape and provided at each stator-port-region end with a plurality of outwardly extending feet for constraining the valving mechanism motion in response to the flow of the fluid medum along a direction into and out of the stator ports, and the feet being shaped to cause spin-rotation of the valving mechanism about the said direction as an axis in response to the fluid flow.

15. Apparatus as claimed in claim 14 and in which means is provided for introducing the fluid medium to the stator port regions at angles to the said direction.

16. In an acoustic-vibration generator, a housing, means for producing a flow of a fluid medium through the housing for generating acoustic vibrations, a stator port region of the housing in the path of the fluid flow therethrough, and a fluid-pressure actuated valving mechanism disposed within the stator port region and provided with means for free-floating the valving mechanism in the said region with a fluid layer interposed between the valving mechanism and the stator port walls, the stator port region and the valving mechanism being so shaped as to constrain the motion of the valving mechanism in response to the flow of the fluid medium along a direction into and out of the stator port.

17. Apparatus as claimed in claim 16 and in which the stator port walls are provided with feet for constraining the valving mechanism and extending along the said direction.

18. Apparatus as claimed in claim 16 and in which runners are provided along the walls of the valving mechanism extending in the said direction.

19. Apparatus as claimed in claim 18 and in which the runners are provided with inclined surfaces.

20. Apparatus as claimed in claim 18 and in which the valving mechanism is provided with inclined wall surfaces.

21. Apparatus as claimed in claim 18 and in which the valving mechanism is provided with a step-bearing surface.

22. Apparatus as claimed in claim 16 and in which there are provided a plurality of bearing pads disposed about the valving mechanism, and means for forcing fluid into each bearing pad in order to provide fluid pressure for controlling the lateral position of the valving mechanism.

23. Apparatus as claimed in claim 16 and in which there is provided a central strut extending from the axis of the valving mechanism into the stator port region to support the valving mechanism.

24. Apparatus as claimed in claim 23 and in which the said strut is secured at the end of the valving mechanism and extends through bearing surfaces beyond the stator port region.

25. Apparatus as claimed in claim 24 and in which the said strut is connected to an external load or control device.

26. In an acoustic-vibration generator, a housing, means for producing a flow of a fluid medium through the housing for generating acoustic vibrations, a pair of stator port regions of the housing in the path of the fluid flow therethrough, a fluid-pressure actuated valving mechanism disposed between and within the stator port regions and provided with means for free-floating the valving mechanism in the said regions with a fluid layer interposed between the valving mechanism and the stator port walls, and means controlled by the input fluid-flow power for varying the movement of the valving mechanism with respect to the stator port regions between substantially single-ended Class A operation and Class C operation.

27. Apparatus as claimed in claim 26 and in which the valving mechanism is provided at one end with feet extending into the corresponding stator port region, and a land at the other end.

28. Apparatus as claimed in claim 1 and in which the valving mechanism is provided with unsymmetrical means for initiating spin-rotation of the same.

29. Apparatus as claimed in claim 1 and in which there is provided means for directing supplemental pressurized fluid flow having components of force directed against the valving mechanism in a direction normal to the direction of movement of the same with respect to the stator port region.

30. An acoustic-vibration generator having, in combination, a housing provided with a stator port region, a fluid-pressure actuated valving mechanism disposed within the stator port region and provided with means for free-floating the valving mechanism in the said region with a fluid layer interposed between the valving mechanism and the stator port walls, means for introducing a fluid medium under pressure into said housing wherein the flow of the fluid medium may be subjected to a variational throttling action by said valving mechanism moving with respect to the stator port region, and a frequency-controlling acoustic feedback path connected to convey fluid-dynamic pressure variations produced by the said variational throttling action upon the valving mechanism in such phase and magnitude as to control and sustain its valving action with respect to the stator port region, thereby to produce a pulsating flow of the fluid medium for generating acoustic vibrations.

31. An acoustic-vibration generator having, in combination, a housing provided with a stator port region, a fluid-pressure actuated valving mechanism disposed within the stator port region and provided with means for free-floating the valving mechanism in the said region with a fluid layer interposed between the valving mechanism and the stator port walls, the stator port region and the valving mechanism being so shaped as to constrain the motion of the valving mechanism in response to the flow of the fluid medium along a direction into and out of the stator port, means for introducing a fluid medium under pressure into said housing wherein the flow of the fluid medium may be subjected to a variational throttling action by said valving mechanism moving with respect to the stator port region, and a frequency-controlling acoustic feedback path connected to convey fluid-dynamic pressure variations produced by the said variational throttling action upon the valving mechanism in such phase and magnitude as to control and sustain its valving action with respect to the stator port region, thereby to produce a pulsating flow of the fluid medium for generating acoustic vibrations.

32. An acoustic-vibration generator having, in combination, a housing provided with a stator port region, a fluid-pressure actuated valving mechanism disposed within the stator port region and provided with means for free-floating the valving mechanism in the said region with a fluid layer interposed between the valving mechanism an the stator port walls, the valving mechanism separating two fluid-containing sections of the housing beyond the stator port region, means for introducing a fluid medium under pressure into said housing wherein the flow of the fluid medium may be subjected to a variational throttling action by said valving mechanism moving with respect to the stator port region, and frequency-controlling reflection means for acoustically feeding back fluid dynamic pressure variations produced by the said variational throttling action upon the valving mechanism in such phase and magnitude as to control and sustain its valving action, thereby to produce a pulsating flow of the fluid medium for generating acoustic vibrations.

33. An acoustic-vibration generator having, in combination, a housing provided with a stator port region, a fluid-pressure actuated valving mechanism disposed within the stator port region and provided with means for free-floating the valving mechanism in the said region with a fluid layer interposed between the valving mechanism and the stator port walls, the stator port region and the valving mechanism being so shaped as to constrain the motion of the valving mechanism in response to the flow of the fluid medium along a direction into and out of the stator port, the valving mechanism separating two fluid-containing sections of the housing beyond the stator port region, means for introducing a fluid medium under pressure into said housing wherein the flow of the fluid medium may be subjected to a variational throttling action by said valving mechanism moving with respect to the stator port region, and frequency-controlling reflection means for acoustically feeding back fluid-dynamic pressure variations produced by the said variational throttling action upon the valving mechanism in such phase and magnitude as to control and sustain its valving action, thereby to produce a pulsating flow of the fluid medium for generating acoustic vibrations.

34. An acoustic-vibration generator having, in combination, a housing, means for continually introducing a fluid medium under pressure at a predetermined intermediate point of the housing to permit the flow of the fluid medium in sections of the housing on each side of the intermediate point, a stator port region for receiving the fluid medium, a valving mechanism disposed within the stator port region and provided with means for free-floating the valving mechanism in the said region with a fluid layer interposed between the valving mechanism and the stator port walls, the valving mechanism repetitively simultaneously decelerating the flow of the fluid medium in one section of the housing and accelerating the flow of the fluid medium in the other section of the housing as it moves relative to the stator port region thereupon to cause the resulting out-of-phase pressure variations produced in the said one and the said other sections respectively simultaneously to decelerate and accelerate the flow of the fluid medium in the said other and the said one sections, thereby to produce a push-pull pulsating flow of the fluid medium in the housing for generating acoustic vibrations.

35. An acoustic-vibration generator having, in combination, a housing, means for continually introducing a fluid medium under pressure at a predetermined intermediate point of the housing to permit the flow of the fluid medium in sections of the housing on each side of the intermediate point, a stator port region for receiving the fluid medium, a valving mechanism disposed within the stator port region and provided with means for free-floating the valving mechanism in the said region with a fluid layer interposed between the valving mechanism and the stator port walls, the stator port region and the valving mechanism being so shaped as to constrain the motion of the valving mechanism in response to the flow of the fluid medium along a direction into and out of the stator port, the valving mechanism repetitively simultaneously decelerating the flow of the fluid medium in one section of the housing and accelerating the flow of the fluid medium in the other section of the housing as it moves relative to the stator port region thereupon to cause the resulting out-of-phase pressure variations produced in the said one and the said other sections respectively simultaneously to decelerate and accelerate the flow of the fluid medium in the said other and the said one sections, thereby to produce a push-pull pulsating flow of the fluid medium in the housing for generating acoustic vibrations.

36. An acoustic-vibration generator having, in combination, a housing provided with stator port regions, a valving mechanism, means for actuating said valving mechanism, the stator port regions and the valving mcehanism being so shaped that fluid dynamic forces developed by the motion of the valving mechanism with respect to the stator port regions act to center the said valving mechanism in the said stator port regions to prevent direct contact between them, means for introducing a fluid medium under pressure into the said housing wherein the flow of the fluid medium may be subjected to variational throttling action by motion of the said valving mechanism with respect to the stator port regions, thereby to produce a pulsating flow of the fluid medium for generating acoustic vibrations.

37. An acoustic-vibration generator as claimed in claim 5 and in which the displacement of the valving mechanism is sufficiently large, the viscosity of the fluid medium is sufficiently high, and the diametrical clearance between the valving mechanism and the stator port walls is sufficiently small so that during the portion of the period of the acoustic vibrations that the valving mechanism lies within a stator port the flow of the fluid medium through that port is viscosity-controlled and, thereby, substantially cut-off, while during the portion of the period that the valving mechanism lies outside of a stator port the flow of the fluid medium through that port is substantially "Bernoulli" controlled.

38. An acoustic vibration generator comprising a housing which defines a path for the flow therethrough of a fluid medium under pressure, a fluid flow control means interposed in said path to modulate repetitively the flow through said path to produce pressure variations giving rise to acoustic vibrations, said flow control means consisting of a port structure forming a portion of said housing and a pressure actuated valve driven relative to the port structure by said pressure variations to sustain the flow modulation, and means for free-floating the valve relative to said port structure with a fluid layer interposed between the cooperating surfaces of said valve and said port structure.

References Cited in the file of this patent

UNITED STATES PATENTS 2,792,804    Bouyoucos _____ May 21, 1957